G. B. LAMBERT.
IGNITER.
APPLICATION FILED JUNE 12, 1912.

1,072,961.

Patented Sept. 9, 1913.
2 SHEETS—SHEET 1.

WITNESSES
Geo. W. Naylor
John K. Brachvogel

INVENTOR
Gerard B. Lambert
BY Munn & Co
ATTORNEYS

G. B. LAMBERT.
IGNITER.
APPLICATION FILED JUNE 12, 1912.
1,072,961.
Patented Sept. 9, 1913.
2 SHEETS—SHEET 2.
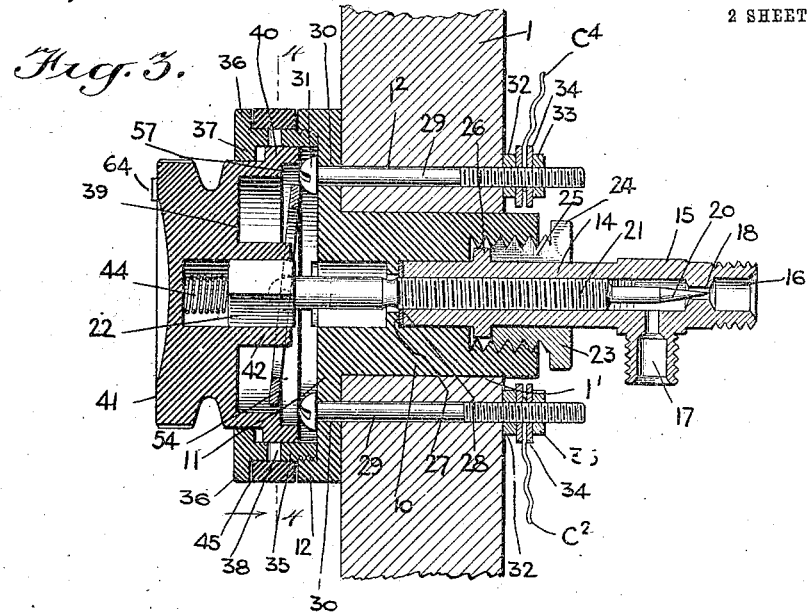
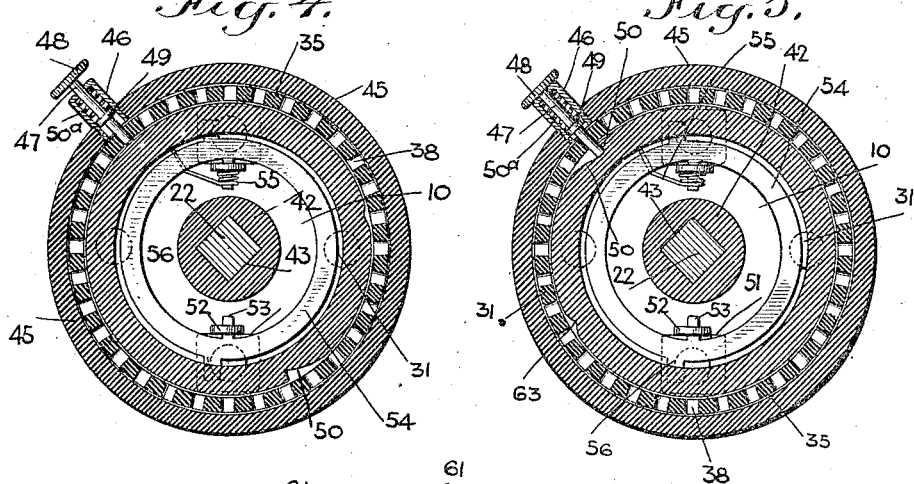
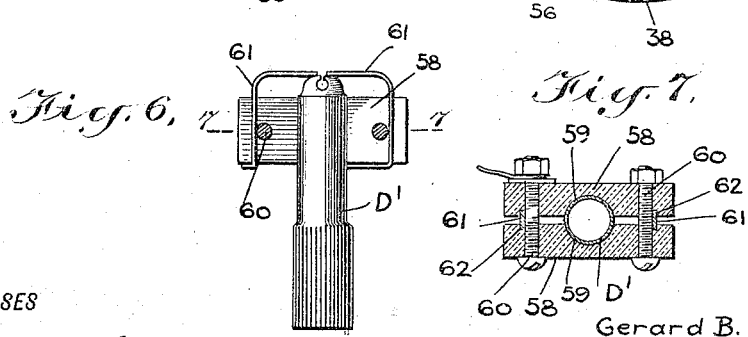
WITNESSES
INVENTOR
Gerard B. Lambert
BY
ATTORNEYS

UNITED STATES PATENT OFFICE.

GERARD BARNES LAMBERT, OF NEW YORK, N. Y.

IGNITER.

1,072,961. Specification of Letters Patent. Patented Sept. 9, 1913.

Application filed June 12, 1912. Serial No. 703,221.

*To all whom it may concern:*

Be it known that I, GERARD BARNES LAMBERT, a citizen of the United States, and a resident of the city of New York, borough of Manhattan, in the county and State of New York, have invented a new and Improved Igniter, of which the following is a full, clear, and exact description.

This invention relates to igniters for the lamps of motor vehicles and for other like purposes, and has reference more particularly to a device of this class, which comprises a valve for controlling the supply of fuel to the lamp, a fuel igniting device, and controlling means for the valve and the igniting means.

An object of the invention is to provide a simple and efficient igniter for lighting the gas lamps of automobiles or the like, by means of the electric ignition system of the automobile or by means of any other ignition device available for the purpose, which can be operated by a very simple manipulation, which is compact in form, and which in no way detracts from the appearance of the motor vehicle or other apparatus with which it is employed.

A further object of the invention is to provide an igniter of the class described, by means of which the supply of fuel to the lamps can be exactly adjusted and controlled, which can be set so that the flames of the lamps may be of predetermined size or brilliancy, and which can be operated with certainty, without inspecting the flames of the lamps, to determine the character thereof.

A still further, and important object of the invention is to provide an igniter which can be operated to light the lamps, and to control the flames thereof by means of the fuel control valve, which may thereby be opened to various, predetermined degrees, so that the lamps may illumine with greater or less brilliancy, as may be desirable or necessary.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
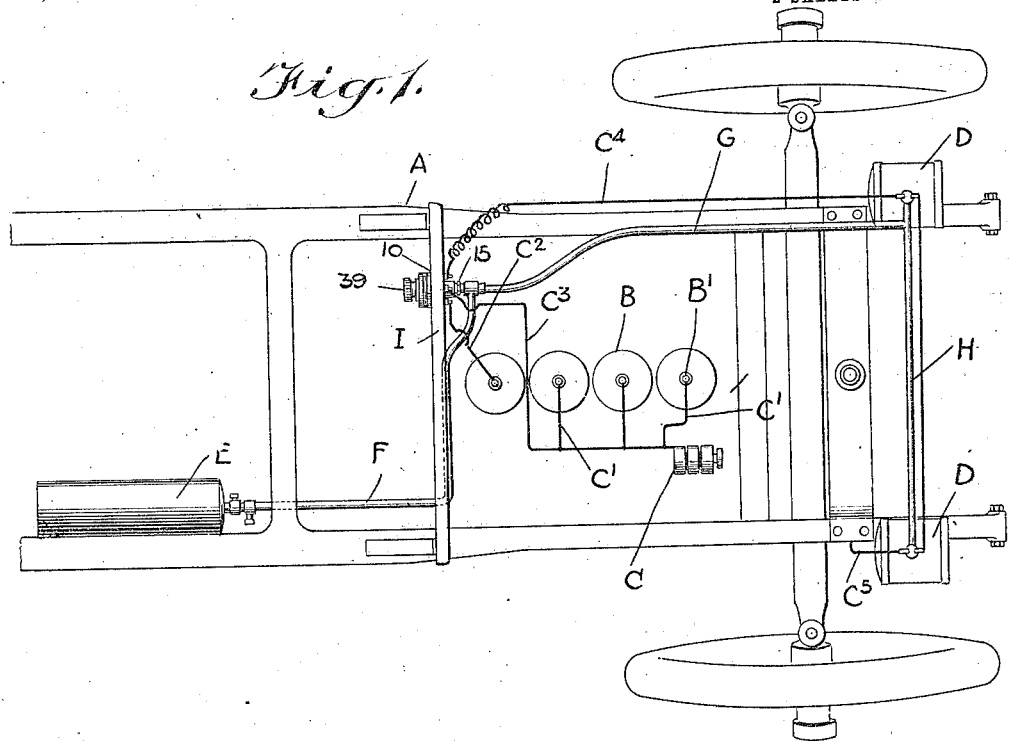
Figure 2:
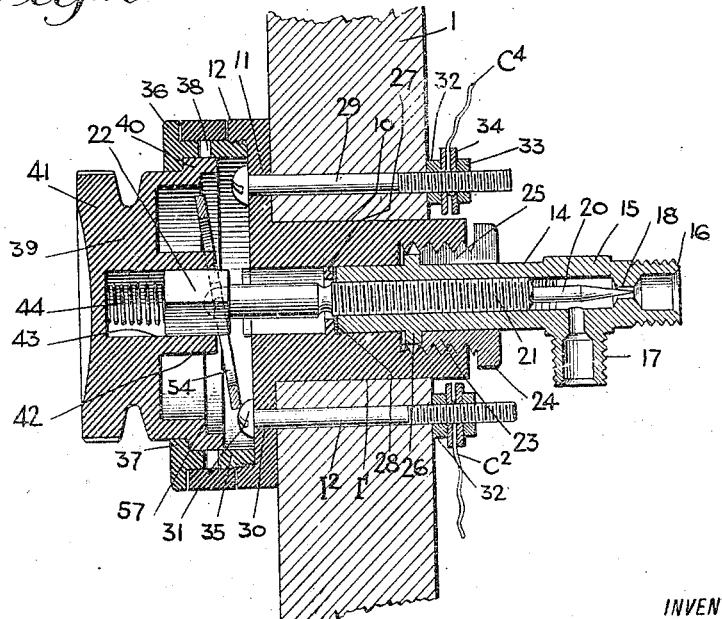

Figure 1 is a diagrammatic plan view of a motor vehicle having an embodiment of my invention applied thereto and associated with the acetylene gas lamps of the ignition system of the engine of the vehicle; Fig. 2 is an enlarged horizontal section of an embodiment of my invention mounted upon the dashboard of a vehicle; Fig. 3 is a vertical section of the device; Fig. 4 is a transverse section on the line 4—4 of Fig. 3; Fig. 5 is a view similar to Fig. 4 showing certain of the parts in different positions; Fig. 6 is a horizontal section of an acetylene gas burner having spark gap terminations associated therewith, so that the fuel at the burner can be ignited by means of my device; and Fig. 7 is a transverse section on the line 7—7 of Fig. 6.

Before proceeding to a more detailed explanation of my invention it should be clearly understood that while the igniter is designed particularly for use with motor vehicles driven by internal combustion engines having electric ignition systems, and provided with acetylene gas lamps, it can also be advantageously employed under other circumstances, and can be applied to different apparatus.

It is the present practice to supply gas lamps of automobiles with fuel consisting of acetylene gas, from suitable tanks or from gas-producing devices employing calcium carbid and water, for the production of gas. The ordinary way of lighting the gas lamps is to turn on the supply of fuel and to light the gas at the burners, by means of a match or in some other similar way. This of course necessitates the stopping of the vehicle, and is a more or less troublesome operation. I am aware that it has hitherto been proposed to employ the electric ignition system of the automobile engine, to light the gas lamps, and that devices for that purpose have been constructed and utilized in practice. My invention, however, embodies an improved igniter by means of which the supply of fuel to the lamps can be exactly controlled, the size of the flame predetermined, and the lamps lighted through the agency of the electric ignition system of the engine, all by a simple manipulation.

An important consideration which I have had in mind in devising the practical embodiment of my invention is that it is frequently necessary to turn down the ames of the gas lamps, for example, when the automobile is being used in city traffic. At other times, under normal conditions, the flames must be so regulated that they will give the greatest possible light. My device includes means whereby the flames can be automatically regulated and set, so that without inspection of the lamps themselves, the latter can be lighted and the flames turned to predetermined brilliancy. The instrument itself is capable of adjustment so that the flames can be not only regulated but allowance can also be made for differences in pressure of the gas, the nature of the fuel supply, and similar circumstances.

Certain of the details of construction shown for example herewith, form no part of the invention, and can be varied in accordance with individual preference and special conditions, without departing from the underlying spirit of the invention.

Referring more particularly to the drawings, I have shown for example, a motor vehicle comprising the usual chassis A supporting the engine B. Associated with the engine is a dynamo C from which conductors C' lead to the spark plugs B' of three cylinders of the engine. The circuit is closed by suitably grounding the same upon the engine or engine frame. The vehicle has gas lamps D provided with burners D' supplied with acetylene gas fuel from a tank E, by means of pipes F, G and H, as will be described more particularly hereinafter.

The igniter is mounted upon any suitable support, such for example as the dashboard I of the vehicle. It is fashioned from suitable insulating material, such as hard rubber, and metal, such as brass. It comprises a tubular body 10 mounted in a suitable opening I' of the dashboard, and having at the inner side thereof a laterally extended part 11 of circular form and provided with an axially disposed, peripheral, internally threaded flange 12. The body 10 is tubular, and receives a correspondingly tubular, internally threaded extension 14 of a valve 15. The latter has a threaded outlet portion 16 which is screwed into the correspondingly formed end of the pipe G. The valve also has a correspondingly threaded inlet portion 17 upon which screws the suitably formed end of the pipe F, so that communication is effected between the pipes F and G, through the valve or union 15. The latter has therein between the outlet 16 and the inlet 17, a reduced part constituting a seat 18 for a needle 20 which has an enlarged threaded stem 21 located in the correspondingly threaded extension 14. The stem projects beyond the inner end of the igniter body and has a head 22 of angular cross section, for a purpose which will appear hereinafter. The body of the igniter, at its outer end, is internally threaded to receive a locking or clamping nut 23 having a laterally extended and angularly formed manipulating head 24. The clamping nut, which is provided with a longitudinal slot 25, engages a radially extended enlargement or flange 26 of the extension 14. The internally threaded part of the igniter body is of enlarged diameter. Beyond it a shoulder 27 is formed in the body. Between this shoulder and the end of the part 14 is a packing ring 28 of suitable material in order that a tight joint may be formed. It will be understood that the clamping nut can be inserted in position without removing the valve 15, as the slot 25 permits the nut to be placed upon the extension 14 and then screwed into position within the threaded end of the igniter body, against the flange 26, forcing the same firmly against the packing ring 28 and the shoulder 27.

The igniter body is secured upon the dashboard by means of three bolts 29 arranged in suitable openings 30 of the part 11, registering with corresponding openings I² of the dashboard. The bolts preferably are provided with slotted heads 31, and have at the outwardly projecting threaded ends retaining nuts 32. Locking nuts 33 are also provided upon the bolts and serve to secure rings or washers 34 thereon, so that the bolts in effect constitute binding posts for the ends of conductors which will be described hereinafter. A collar 35 which, like the body of the igniter, is fashioned from insulating material such as hard rubber, is externally threaded and removably mounted within the correspondingly threaded flange 12. It has at the outer edge, inwardly and outwardly extending flanges 36 and 37, and is provided with a series of radial perforations 38. An annular manipulating member 39, likewise fashioned from insulating material has the inner rim 40 outwardly offset to form a shoulder. It is received within the collar 35 and engages under the inwardly extended flange 37 thereof, so that it can be freely turned but cannot be withdrawn. It has a limited inward, axial movement and is provided with a head 41 preferably burred at the edge, so that it can be conveniently grasped and operated. The operating member has furthermore, a substantially central boss 42 in which is formed a recess 43 of angular cross section corresponding substantially to the cross section of the head 22 of the valve stem and provided to receive the same so that the stem may be turned with the operating member. A helical spring 44 is located in the recess and engages at the inner end thereof and at the extremity of the edge 22, tending to maintain the operating member in a normal position with the shoulder formed by the offset rim, engaging at the under side of the flange 39. A ring 45 likewise preferably fashioned from insulating material, is positioned upon the collar 35, between the flange 36 and the flange 12. It has an opening in which is screwed or otherwise suitably mounted a barrel 46 in which is movably positioned a keeper 47 consisting of a pin movable longitudinally of the barrel and provided at the outside thereof with a suitable manipulating head 48. The pin has within the barrel a rigid collar 49. A spring $50^a$ mounted upon the pin, between the collar and the end of the barrel, tends normally to project the pin against the collar 35. The pin is adapted to enter any one of the series of openings 38 of the collar project through the same, and engage a notch or recess 50 of the operating member. This notch or recess has one side only, beveled or inclined so that when the pin engages within the notch the operating member can be turned in one direction only, and its movement in an opposite direction is prevented.

Brackets 51 having laterally disposed ears 52 are screwed or otherwise suitably mounted upon the part 11 of the igniter body. One of the brackets is held in place by one of the bolts 29, the other bracket being secured in position by means of an auxiliary screw. The ears 52 of the brackets have openings in which are movably received inwardly disposed trunnions 53 of an annular contact member or ring 54 held in a normal, angular position by means of a suitable spring 55. At opposite points the contact 54 has laterally extended lugs 56, which are offset with respect to the trunnions 53, so that any pressure against the lugs will tend to rock the contact on the trunnions and displace it from its normal, angular position. The contact is so proportioned that it will fit within the rim of the operating member, but the lugs extend radially to points such that they can be engaged by the internal shoulder 57 formed by the offset rim 40 of the operating member. Consequently, an inward axial movement of the operating member will engage the lugs and displace the contact members. In its normal position, the contact member engages the head of one of the bolts 29 and thus forms an electrical connection between that bolt and the bolt 20 which holds the one bracket 51 in place.

A conductor $C^2$ leads from the bolt 29 normally engaged by the contact member, to the fourth cylinder of the engine. A conductor $C^3$ leads from the bolt holding the one bracket 51, to the dynamo C, and may in effect be the conductor which likewise joins the dynamo and the conductors $C'$ leading to the first cylinders of the engine. A conductor $C^4$ joins the third bolt 29 and the burners $D'$ of the gas lamps, the burners also being connected by means of a conductor $C^5$ with the engine or engine frame, to ground the circuit.

The spark gaps of the burners may be produced by suitably disposed spark points or terminals of any construction adapted for the purpose. I prefer however to employ at each burner a pair of oppositely disposed insulated bars 58 having registering, rounded recesses or grooves 59 which adapt them to be mounted upon the tubular burners and to be clamped in position thereon by means of screws or bolts 60. These screws or bolts also constitute binding posts to permit the conductors to be attached to the burners. Instead of using wires for the spark terminals I prefer to employ flat strips 61 of suitable metal, received in transverse grooves or recesses 62 of the plates, and laterally disposed over and against an open end of the burner, so that their extremities are spaced apart a distance proper for the formation of a spark gap of the desired dimensions. As the strips are in contact with the bolts or screws 60, electrical contact is assured between the one strip and the conductors attached to the device by the corresponding bolt.

Under normal conditions, when the engine is running, the electric circuits fed by the dynamo C are closed and sparks jump across the gaps of the spark plugs, to ignite the charges in the cylinder in the usual manner. It will be remembered that under these normal conditions the contact ring effects electrical communication between the bolt 29 forming a binding post for the conductor $C^2$ and the bolt 29 which forms a binding post for the conductor $C^3$, so that the spark plug circuits are uninterrupted. When it is desired to ignite the acetylene lamps the operating member 39 is turned to open the valve, which permits gas to flow through the union to the burners of the lamps. As soon as the valve has been opened the operating member is pressed inwardly toward the dash board and swings the contact member to bring the same into engagement with the bolt constituting a binding post for the conductor $C^4$, so that a closed circuit is formed, including the dynamo, the conductor $C^3$, the conductor $C^4$ and the spark gap terminals at the burner. In consequence, sparks are formed at these spark gaps and the gas escaping at the burners is ignited. As soon as the operating member of the igniter is released the spring 44 returns it to its normal position and the spark plug circuits of the engines are reëstablished.

It will be remembered that the notch 50 determines the open position of the valve and it is merely necessary to turn the operating member until the keeper 47 slips into the notch, to insure the opening of the valve to the proper degree. I prefer to provide an additional notch 63, which is fairly shallow and of V-form, so that when the keeper enters this notch it will at once be perceptible to the operator of the device, but not preventing the operating member from being turned in either direction. This notch determines an initial opening of the valve such that the flames of the lamps are low and the lamps are thus adapted for use in city traffic or under similar conditions. In this way the operator can always determine, without actually inspecting the lamps, whether the flames are properly adjusted and of the size or brilliancy desired. To adjust the igniter for different gas pressures or for different flames, the keeper can be located at any one of the series of openings 38 of the collar 35, by simply withdrawing the keeper and turning the ring 45 until the desired point is reached. To facilitate the adjustment of the igniter I provide upon the operating member an indicating projection 64, which corresponds in location to the notch 50. By means of this projection the position of the notch 50 can be exactly determined without difficulty.

While I have herein described the igniter as used in connection with lamps utilizing acetylene gas, it will of course be understood that any other fuel can be ignited by means of the device, and the valve associated therewith for controlling the fuel supply may be of any type adapted for its particular purpose.

By utilizing a continuous contact member, such for example, as the annular element constituting the contact member in the present embodiment of the device, it is possible to operate the contact member regardless of the position into which the operating member has been turned, but the latter is at all times operative with respect to the contact member.

Having thus described my invention, I claim as new and desire to secure by Letters Patent:—

1. The combination with an electric igniting system, a lamp, and a gas supply therefor, of a valve for said gas supply, an operating member mounted to turn and to move bodily and having an operative connection with said valve, whereby when said member is turned it serves to open or close said valve, and whereby said member can move bodily without affecting said valve, a normally inoperative contact member controlling said igniting system and adapted to be operated by a bodily movement of said operating member, and adjustable means for limiting the turning of said operating member so that said valve can be opened to any desirable predetermined extent only.

2. The combination with an electric igniting system, a lamp, and a gas supply therefor, of a valve for said gas supply, an operating member mounted to turn and to move bodily, and a contact member controlling said igniting system and adapted to be operated by said operating member, one of said members being of annular form, and the second of said members having a part adapted at all times to engage said annular member.

3. The combination with an electric igniting system, a lamp, and a gas supply therefor, of a valve for said gas supply, an operating member mounted to turn and to move bodily, and a contact member controlling said igniting system and adapted to be operated by said operating member, said operating member having an annular surface, said contact member having a projection adapted to be engaged by said annular surface when said operating member is moved bodily and in all positions of said operating member.

4. An igniter comprising a valve adapted to control a fuel supply and having a rotatable stem, an operating member mounted to turn and to move in the direction of its turning axis, and having an operative connection with said stem, a pivoted annular contact member adapted to control an electric ignition system and to be operated by said operating member, a spring normally holding said operating member out of engagement with said contact member, and a spring holding said contact member in a normal position.

5. An igniter comprising a body, a valve adapted to control a fuel supply and having a rotatable valve stem projecting into said body, said stem having a head, an operating member mounted to turn, and axially with said stem, having a recess receiving said head, and having a connection therewith such that said stem is constrained to turn with said member while said member is free to move axially without affecting said stem, and a normally inoperative contact member adapted to control an ignition system and to be operated by an axial movement of said operative member.

6. An igniter comprising a body, a valve adapted to control a fuel supply and having a rotatable valve stem projecting into said body, said stem having a head, an operating member mounted to turn, and axially with said stem having a recess receiving said head, and having a connection therewith such that said stem is constrained to turn with said head, while said member is free to move axially without affecting said stem, a normally inoperative contact member adapted to control an ignition system and to be operated by an axial movement of said operating member, and a spring holding said operating member normally from engagement with said contact member.

7. An igniter comprising: a body; a fuel supply valve axially attached to said body; a stem for controlling said valve, projecting into said body; a rotatable member in said body engaging said stem and thereby serving to operate the valve; means on said body and said member whereby the movement of said stem is regulated with respect to said valve; and fuel igniting means associated with said body and controlled by said rotatable member.

8. An igniter comprising: a body; a fuel supply valve axially attached to said body; a stem for controlling said valve, projecting into said body; a rotatable member in said body engaging said stem and thereby serving to operate the valve; adjustable means on said body; means on said member whereby the movement of said stem is regulated with respect to said valve; and fuel igniting means associated with said body and controlled by said rotatable member.

9. An igniter comprising: a body; a fuel supply valve axially attached to said body; a stem for controlling said valve, projecting into said body; a rotatable member in said body engaging said stem and thereby serving to operate the valve; a rotatable ring on said body; means on said ring and said body whereby said ring is locked on same; means on said rotatable member co-acting with said means on said ring whereby the rotation of said member is limited; and fuel igniting means associated with said body and controlled by said rotatable member.

10. An igniter comprising: a body having a plurality of openings on its lateral surface; a rotatable ring on said body over said openings; a rotatable member in said body under said openings; a fuel supply valve axially attached to said body; a stem for operating said valve, projecting into said body and in engagement with said rotatable member; a plunger on said rotatable ring normally engaging an opening in said body, thereby locking said ring on said body; a spring associated with said plunger to normally force same toward the center, whereby said plunger constantly bears against the lateral surface of said rotatable member; means on the lateral surface of said member adapted to engage said plunger, whereby the rotation of same is limited in said body, and fuel igniting means associated with said body and controlled by said rotatable member.

11. An igniter comprising: a cylindrical body having an enlarged portion, said body having a central bore, and said enlarged portion a central recess; a collar threaded into said recess and projecting out of same, having a central bore and outwardly and inwardly projecting flanges at its projecting end; a ring on said collar intermediate said outward flange on said collar and the enlarged portion of the body; a fuel supply valve in said central portion of said body; a stem for controlling said valve projecting into said recess of said collar; a rotatable member in the recess of said collar, having a contracted portion projecting out of same and normally bearing against said inner flange of said collar, said rotatable member having a central recess normally engaging said stem and thereby serving to operate the valve; a radiating projection on the lateral surface of said ring; a spring in said projection and a plunger projecting out of said projection on said ring and co-acting with said spring; means above said projection on said ring attached to said plunger whereby same may be manually operated, said collar having a series of radiating openings under said collar registering with the inwardly projecting end of said plunger, and normally one of said openings being engaged by the said end of said plunger, whereby said ring is locked on said body and said plunger is normally forced toward the center by said spring in said projection on said ring, the inwardly projecting end of said plunger normally bearing against the lateral surface of the rotatable member in said collar, due to the pressure of the resilient member; means on the lateral surface of said rotatable member adapted to receive the inwardly projecting end of said plunger when rotated and thereby indicating a certain opening in the valve, means on same surface of said rotatable member co-acting with said inwardly projecting end of said plunger when rotating said member whereby the rotation of same is limited; and fuel igniting means associated with said body and controlled by said rotatable member.

12. An igniter comprising a body: a pivoted annular contact member adapted to control an electric ignition system in said body; a bodily movable member in said body adjacent to said annular contact member and in engagement with same; a resilient member associated with said bodily moving member and normally maintaining same in a predetermined position; and a fuel supply means associated with said body and controlled by said movable member.

13. An igniter comprising: a body; a pivoted annular contact member; lugs centrally off set projecting laterally of said annular contact member; an axially bodily movable member contacting with said lugs of said annular contacting member, a resilient member associated with said contacting member keeping same normally in a predetermined position, and said lugs of said annular member contacting with said bodily moving member, said bodily moving member when forced inwardly into said body operating said contacting member; a fuel supply means associated with said body and controlled by said movable member.

In witness whereof I have signed my hand to this specification in the presence of two subscribing witnesses.

GERARD BARNES LAMBERT.

Witnesses:
JOSEPH F. DEINEF,
H. BOWEN.